March 30, 1965   J. H. GUIGNARD   3,176,158
SIGNAL GENERATOR
Filed April 30, 1962   2 Sheets-Sheet 1

Jean Hubert Guignard
INVENTOR.

BY Richard E. Bee

ATTORNEY

March 30, 1965  J. H. GUIGNARD  3,176,158
SIGNAL GENERATOR
Filed April 30, 1962  2 Sheets-Sheet 2

Jean Hubert Guignard
INVENTOR.

BY Richard E. Bee

ATTORNEY

United States Patent Office 3,176,158
Patented Mar. 30, 1965

3,176,158
SIGNAL GENERATOR
Jean Hubert Guignard, L'Hay les Roses, Seine, France, assignor to Societe de Prospection Electrique Schlumberger, S.A., Paris, France, a corporation of France
Filed Apr. 30, 1962, Ser. No. 191,025
Claims priority, application France, May 19, 1961, 862,470
9 Claims. (Cl. 307—88.5)

This invention relates to electrical signal generators and, particularly, to such generators of the triggered type. Thought not limited thereto, this invention is particularly useful in telemetering systems and in connection with geophysical exploration apparatus.

It is frequently desired to make periodic measurements of a quantity and to transmit these measurements to a remote location for observation. Periodic-type measurements are especially desirable where several different quantities are to be measured and the results transmitted over a transmission system of limited capacity. Because of the periodic nature of the measurements for each quantity, the measurements for the different quantities may be transmitted one after the other in a sequential manner over the same transmission link. This technique is referred to as "time multiplexing" or "time sharing."

In periodic measuring systems heretofore proposed, the periodic measurements have been transmitted as modulated pulse-type signals where the pulses are of a rectangular shape. This has the disadvantage that the transmission link must have a relatively wide frequency passband in order to faithfully transmit such pulse-type signals without undue distortion.

This problem is particularly troublesome in geophysical exploration systems. In one type of system, known as "well logging," an exploring device is moved through a borehole drilled deep into the earth. This exploring device measures various characteristics of the subsurface earth formations lying adjacent to the borehole. These measurements are then transmitted to the surface of the earth by way of the cable which is used to suspend the device in the borehole. This cable is usually of the multi-conductor type, but nevertheless the number of such conductors is relatively limited. Also, the frequency characteristics of the transmission lines formed by such cable conductors usually is rather limited. It would be desirable, therefore, to have some means for transmitting the subsurface measurements over these limited transmission facilities which would require a minimum of frequency bandwidth. Since this means will be located in the subsurface exploring device, where space limitations are relatively severe, it is desirable that such means have a minimum of bulk and complexity. A signal generator constructed in accordance with the present invention will achieve these desired results.

It is an object of the invention, therefore, to provide a new and improved signal generator for use in remote telemetering systems.

It is a further object of the invention to provide a new and improved signal generator for exciting telemetering transducers.

It is another object of the invention to provide a new and improved signal generator for generating a discontinuous signal which may be used with circuits having relatively limited frequency passbands.

It is a further object of the invention to provide a new and improved signal generator for generating signals of increased power with a minimum of circuit bulk and complexity.

It is an additional object of the invention to provide a new and improved signal generator for use in the investigation of subsurface earth formations lying adjacent a borehole drilled into the earth.

In accordance with the invention, a signal generator comprises a series circuit including an inductor, a capacitor, load means and a switching device. The signal generator also includes circuit means for charging the capacitor. The signal generator further includes circuit means for rendering the switching device conductive to enable the capacitor to discharge through the inductor and the load means. The signal generator also includes circuit means included in the charging circuit means for decreasing the charging circuit impedance to enable rapid recharging of the capacitor.

For a better understanding of the present invention, together with other and further objects thereof, reference is had to the following description taken in connection with the accompanying drawings, the scope of the invention being pointed out in the appended claims.

Referring to the drawings.

Figure 1:
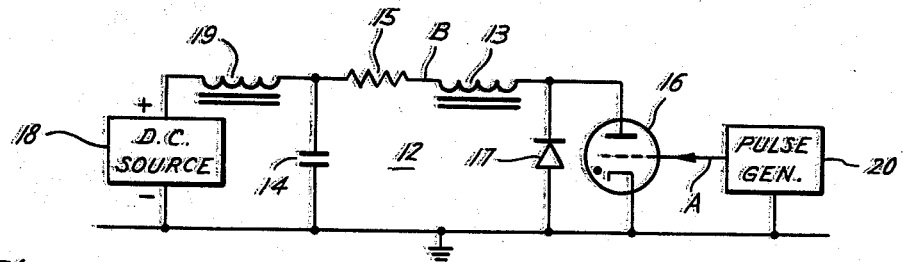
FIG. 1 is a circuit diagram of a first embodiment of a signal generator constructed in accordance with the present invention.

Referring to FIG. 1 of the drawings, the signal generator there shown comprises a series circuit 12 which includes an inductor 13, a capacitor 14, load means 15 and a switching device 16. Load means 15 is represented by a resistor. It is noted, however, that this load means may take various forms depending on the particular manner in which the signal generator is being used. In a telemetering system, for example, this load means could be one of the transducer devices which is measuring one of the physical quantities of interest. The series circuit 12 is constructed to have a high Q factor whenever the switching means 16 is conductive. Load means 15 is constructed to provide an impedance value which is consistent with this objective. Consequently, load means 15 should preferably present a relatively low impedance value in the series circuit 12. Switching device 16 is a gas thyratron tube and, as such, has an asymmetrical conductivity characteristic, that is, is more favorable to the flow of current in one direction than in the other. The switching device 16 is shunted by an asymmetrically-conductive element represented by a diode 17. This diode 17 is connected in an opposite polarity manner relative to the polarity of the switching device 16.

The signal generator to FIG. 1 also includes a circuit for charging the capacitor 14. This circuit includes energy supply means represented by a D.C. source 18 and high impedance circuit means represented by an inductor 19 for coupling the source 18 to the capacitor 14. The inductance of inductor 19 is much larger than that of inductor 13.

The signal generator of FIG. 1 also includes circuit means represented by a pulse generator 20 for supplying trigger pulses to a control electrode of the switching device 16. Each of these trigger pulses serves to render the switching device 16 conductive, at which time the impedance of this switching device 16 assumes a value which is relatively small compared to the other impedances in the series circuit 12.

Figure 4:
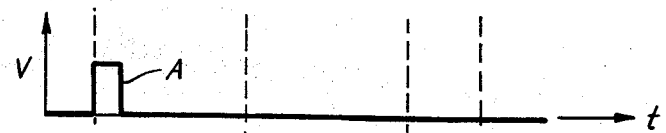
FIGS. 4–10 are timing diagrams or waveforms used in explaining the operation of the circuits of FIGS. 1–3.

Considering the operating of the FIG. 1 circuit, it is initially assumed that the switching device 16 is in a nonconductive condition. At this time, the D.C. source 18 serves to charge the capacitor 14 by way of the inductor 19. After a predetermined interval of time, determined by the time constants of this charging circuit, the capacitor 14 is completely charged and the voltage thereacross is equal to the terminal voltage of the D.C. source 18. A trigger pulse is then supplied by the pulse generator 20 to the control electrode of the switching device 16. This trigger pulse is represented by waveform A of FIG. 4. This trigger pulse renders the switching device 16 conductive and effectively short circuits the corresponding side of inductor 13 to ground. Since inductor 19 has a much higher impedance value than inductor 13, the capacitor 14 discharges itself by way of inductor 13. The resulting current flow through load means 15 and inductor 13 is represented by waveform B of FIG. 5.

The portion of waveform B in the interval $t_0$–$t_1$ represents the occurrence of current flow through the switching device 16. At the moment $t_1$, the energy stored in capacitor 14 has been completely transferred to the inductor 13. Subsequent thereto, the inductor 13 begins supplying this energy back to the capacitor 14. The corresponding current flow (during $t_1$–$t_2$) is in the opposite direction. Such current flow takes place by way of the diode 17. After the energy stored in inductor 13 is returned to the capacitor 14, current flow and, hence, energy transfer in the series circuit 12 ceases. This occurs because the switching device 16 is no longer conductive. Switching device 16 is returned to a non-conductive condition by the loss of proper anode-to-cathode potential during the occurrence of current flow through the diode 17. Thus, current flow in the series circuit 12 ceases at time $t_2$.

The D.C. source 18 then acts to replace any loss of charge on the capacitor 14. Because of the energy transfer back and forth in the series circuit 12, the charge on capacitor 14 at time $t_2$ is almost equal to its initial charge. Some energy is, of course, dissipated in the load means 15 as well as in any inherent resistance associated with any of the other elements in the circuit. After recharging of the capacitor 14, the circuit is ready for the next cycle of operation. This next cycle occurs upon the appearance of the next trigger pulse at the output of pulse generator 20.

Figure 5:
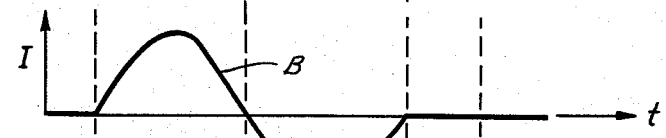

As indicated by waveform B of FIG. 5, the current flow through the load means 15 for each cycle of operation corresponds very nearly to a single cycle of a sine wave. The duration of the first half of this sine wave cycle is very nearly equal to one half the period of the resonant frequency of the series LC circuit formed by inductor 13 and capacitor 14. The second or negative half of this sine wave cycle is of somewhat greater duration than the positive half because of the damping action provided by the load means 15 and other residual resistances in the circuit.

Since the Q factor of this series circuit is relatively high, the amplitude of the first or positive half of the sine wave cycle is of a substantially constant value from one cycle to the next. This result is obtained even where the load means 15 undergoes slight variations during the course of succeeding cycles of operation. Consequently, this positive-going part of the sinusoid constitutes a particularly useful form of signal for making periodic measurements in a load circuit. Also, owing to its sine wave shape, it may be readily transmitted to a remote location by a transmission line having a relatively narrow frequency band-width. Also, in the case of geophysical exploration in a borehole where electrodes are used to emit current into the adjacent earth formations, the fact that the load current, which in this case would be the current which is emitted into the earth formations, has an equal number of both positive and negative half cycles serves to avoid the occurrence of undesirable polarization effects which would occur for the case of a unidirectional current flow.

Figure 2:
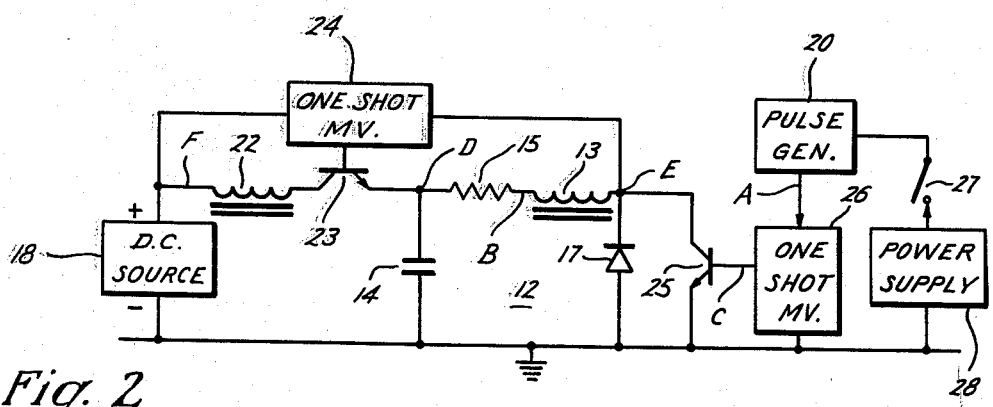
FIG. 2 is a circuit diagram of a second embodiment of the invention.

Referring now to FIG. 2 of the drawings, there is shown an improved embodiment of a signal generator of the general type shown in FIG. 1. The same reference numerals have been used for corresponding elements in the two figures. The signal generator of FIG. 2 has the advantage of being able to operate at higher repetition rates or triggering rates than the circuit of FIG. 1.

In FIG. 2, the D.C. source 18 is coupled to the capacitor 14 by way of an inductor 22 and a second switching device represented by a transistor 23. Inductor 22 has an inductance value which is much smaller than the inductance of the inductor 13 in the series circuit 12. A control electrode (base electrode) of the transistor 23 is connected to the output of a one-shot multivibrator 24. Multivibrator 24 is constructed so that in its quiescent state the transistor 23 will be biased to a non-conductive condition. The input circuit of multivibrator 24 is connected between the D.C. source 18 and the right-hand side of inductor 13. This input circuit is constructed to provide a relatively high value of input impedance.

The switching device which is included in the series circuit 12 in this embodiment takes the form of a transistor 25. This transistor 25 is connected so that its direction of easy current flow is opposite to that of the diode 17. The control electrode (base electrode) of transistor 25 is connected to the output of a one-shot multivibrator 26. Multivibrator 26 is constructed so that when it is in its stable state, the transistor 25 will be biased to a non-conductive condition. Multivibrator 26 is triggered by trigger pulses from the pulse generator 20. Means are provided for delaying or disabling the operation of pulse generator 20. This includes a switch 27 which is used to control the connection of a power supply 28 to the pulse generator 20. When switch 27 is open, pulse generator 20 is disabled.

Considering the operation of the signal generator circuit of FIG. 2, when the circuit is first turned on, the switch 27 is initially placed in an open condition so that the pulse generator 20 is disabled. At this time, both transistors 23 and 25 are biased to a non-conductive condition and, hence, present relatively high impedances between their collector and emitter electrodes. In this condition, the capacitor 14 is slowly charged by way of the input circuit of one-shot multivibrator 24, inductor 13 and load means 15. This initial charging is relatively slow since this circuit is of a relatively high impedance. When the capacitor 14 is completely charged so that the voltage thereacross is equal to the terminal voltage of the D.C. source 18, then the switch 27 is closed so that the signal generator circuit may begin its normal operation.

Figure 6:
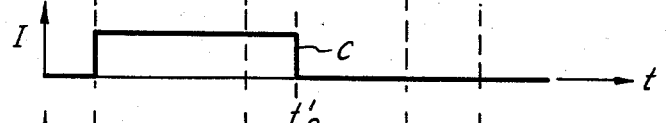

With the switch 27 closed, pulse generator 20 operates to supply periodic trigger pulses (waveform A) to the one-shot multivibrator 26. In response to each of these trigger pulses, the one-shot multivibrator 26 supplies an extended duration activating pulse to the base electrode of the transistor switching device 25. This extended duration activating pulse is indicated by waveform C of FIG. 6. Its duration ($t_0$–$t_0'$) is greater than the duration of the first half cycle ($t_0$–$t_1$) of the oscillation in the series circuit 12 and is smaller than the overall duration of the complete cycle of oscillation ($t_0$–$t_2$). This activating pulse from multivibrator 26 renders the transistor switching device 25 conductive. This reduces the emitter-to-collector impedance of transistor 25 to a small value compared to the other impedances of circuit 12. Consequently, transistor switching device 25 serves as the current flow path during the first half cycle of oscillation, during which energy is being transferred from capacitor 14 to inductor 13. During the second half cycle of oscillation, when energy is being returned to capacitor 14, the opposite-direction current flow is passed by way of the diode 17. After the second half cycle of oscillation, further oscillations are prevented since the transistor switching device 25 is no longer conductive. Consequently, as for the case of FIG. 1, the current flow through the load means 15 and inductor 13 of FIG. 2 corresponds to a single cycle of a sine wave as indicated in FIG. 5.

Figure 7:
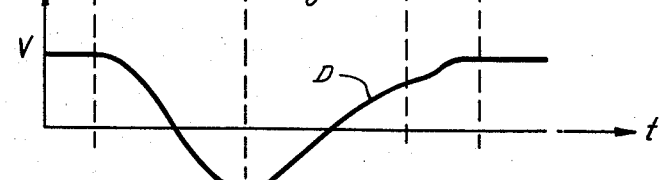
Figure 8:

The variation in voltage across the capacitor 14 is represented by waveform D of FIG. 7. The variation in voltage across the parallel combination of diode 17 and transistor 25 is represented by waveform E of FIG. 8. This voltage is of approximately a zero value so long as either the transistor 25 or the diode 17 is conductive. This corresponds to the duration of the single cycle of oscillation ($t_0$–$t_2$). When the oscillation ceases at $t_2$, the voltage at the upper end of this diode-transistor combination suddenly rises to the voltage level at the upper terminal of capacitor 14. This voltage level at time $t_2$ is lower than the terminal voltage of source 18 because of the energy dissipated in the load means 15. This sudden rise in voltage at the upper end of the diode-transistor combination is, however, sufficient to trigger the one-shot multivibrator 24. This triggering causes the multivibrator 24 to supply an activating pulse to the base electrode of the transistor 23. This activating pulse renders the transistor 23 conductive so that its collector-to-emitter impedance assumes a small value. This enables the source 18 to recharge the capacitor 14 by way of inductor 22, this inductor also having a relatively small impedance value.

Figure 9:
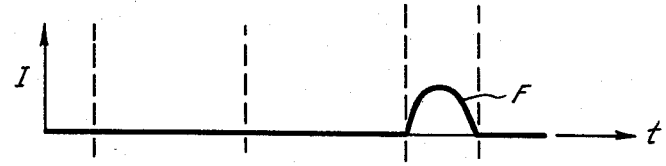

The LC charging circuit formed by inductor 22 and capacitor 14 when transistor 23 is conductive has a relatively small time constant so that the charge on capacitor 14 is rapidly restored to its initial value. This occurs during time interval $t_2$–$t_3$. The corresponding current flow through inductor 22 is indicated by waveform F of FIG. 9. The power represented by this pulse of current corresponds very closely to the power consumed by the load means 15 during the oscillatory period. The duration of the activating pulse from multivibrator 24 is constructed so that the conductive time of transistor 23 is approximately equal to the time constant of the charging circuit formed by inductor 22 and capacitor 14.

Since the time required for recharging the capacitor 14 after a cycle of oscillation in the series circuit 12 is made relatively short in the FIG. 2 embodiment, the next succeeding cycle of operation may occur fairly soon after the first cycle. Consequently, fairly high repetition rates or trigger rates may be used with the FIG. 2 embodiment.

The preliminary delay provided by switch 27 enables the capacitor 14 to build up a fairly high voltage thereacross before the periodic oscillation of the series circuit 12 is begun. This ensures that the sudden voltage rise occurring at the upper end of the combination of diode 17 and transistor 25 at the end of each cycle will be of sufficient value to trigger the one-shot multivibrator 24. If this initial delay were not provided and if the trigger rate were relatively high, then the capacitor 14 might never be charged sufficiently to produce enough of a voltage transient at the end of the cycle to trigger the multivibrator 24. Once the desired initial charge is established on the capacitor 14, the circuit of FIG. 2 will function in the correct manner for as long as is desired.

If it is not convenient to use the input circuit of the one-shot multivibrator 24 to establish the initial charge on capacitor 14, then the connection between D.C. source 18 and the multivibrator 24 may be omitted and the source 18 instead connected directly to the capacitor 14 by way of either a resistor or an inductor of relatively high impedance value.

Figure 3:
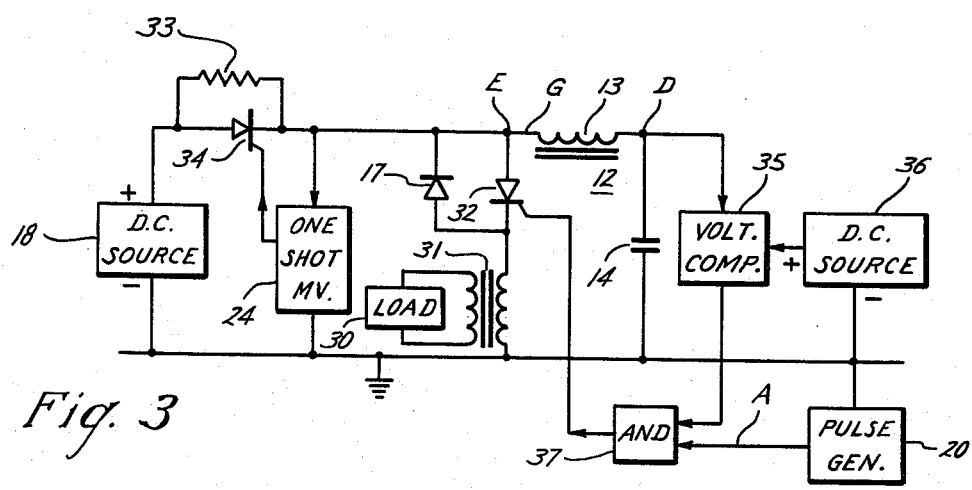
FIG. 3 is a circuit diagram of a third embodiment of the invention.

Referring now to FIG. 3 of the drawings, there is shown a further embodiment of a signal generator constructed in accordance with the present invention. Certain features of this embodiment are the same as those discussed in the earlier embodiments and, consequently, corresponding elements are indicated by the same reference numerals. In FIG. 3, the series circuit 12 has a somewhat different form of load means. In particular, the load proper, which is indicated by load element 30, is coupled to the series circuit 12 by way of a current transformer 31. This, in effect, places the load element 30 in series in the circuit 12, though the effective impedance seen by the circuit 12 may differ from the actual impedance of load 30 due to the impedance transforming properties of the transformer 31. Transformer 31, therefore, enables the impedance of load 30 to be matched with the effective value of load impedance which is desired in the series circuit 12. The switching device included in the series circuit 12 for initiating each cycle of oscillation is, in this embodiment, in the form of a semiconductor device 32 which behaves like a gas thyratron. One commercially available form of such a semiconductor thyratron is known as a "silicon controlled rectifier."

The FIG. 3 embodiment also includes a modified form of charging circuit for the capacitor 14. In particular, the source 18 is coupled to capacitor 14 by way of a resistor 33 and the inductor 13 which forms part of the series circuit 12. Resistor 33 has a resistance value which is relatively high compared to the impedance of inductor 13 at the resonant frequency of the series circuit 12. A second switching device represented by a semiconductor thyratron 34 is shunted across the resistor 33. The control electrode of this semiconductor thyratron 34 is connected to the output of the one-shot mulivibrator 24. The normal output of multivibrator 24 is such that the semiconductor thyratron 34 is normally non-conductive.

The circuit of FIG. 3 also includes means for preventing the application of any trigger pulses from the pulse generator 20 to the switching device 32 in the series circuit 12 until after the voltage across capacitor 14 has reached a predetermined value. This means is automatic in operation and includes a voltage comparator 35 having a first input terminal coupled to the upper end of capacitor 14. A second input terminal of this voltage comparator 35 is supplied with a D.C. reference voltage by a D.C. source 36. This reference voltage is proportional to the desired initial voltage level across capacitor 14. The output of voltage comparator 35 is connected to a first input terminal of a coincidence circuit or "AND" circuit 37. The trigger pulses from pulse generator 20 are supplied to a second input terminal of this AND circuit 37. The output side of AND circuit 37 is connected to the control electrode of the semiconductor switching device 32. The output voltage from AND circuit 37 when either or both of the input signals are absent is such that the semiconductor thyratron 32 is in a non-conductive condition.

Considering the operation of the FIG. 3 signal generator, when the circuit is first energized, semiconductor switching devices 32 and 34 are in a non-conductive condition and present high impedances between their anode and cathode electrodes. D.C. source 18 commences to supply charging current to the capacitor 14 by way of the resistor 33 and the inductor 13. This initial charging action is relatively slow due to the high resistance of resistor 33. When the voltage across capacitor 14 reaches a predetermined level, as determined by the reference voltage supplied by source 36, the voltage comparator 35 produces at its output terminal an activating signal which is supplied to AND circuit 37. When this activating signal is present, AND circuit 37 will operate to pass each of the pulses supplied thereto by the pulse generator 20.

Assuming that voltage comparator 35 is supplying the necessary activating signal, the first trigger pulse passed by AND circuit 37 is supplied to the control electrode of the semiconductor thyratron 32. This renders the semiconductor thyratron 32 conductive and thus reduces its anode-to-cathode impedance to a negligible value. This initiates the desired cycle of oscillation in the series circuit 12. At the end of the first cycle of oscillation ($t_2$), the voltage at the upper side of the diode 17 and thyratron 32 combination suddenly rises since each of these devices has ceased to be conductive. This sudden rise in voltage serves to trigger the one-shot multivibrator 24. As a consequence, multivibrator 24 generates an activating pulse which is supplied to the control electrode of the semiconductor thyratron 34 located in the charging circuit. This renders the semiconductor thyratron 34 conductive and effectively shorts out the resistor 33. This enables a rapid recharging of the capacitor 14 by way of current flow from the source 18 through the semiconductor thyratron 34 and the inductor 13. After a short interval of time, which is sufficient for the recharging of capacitor 14, the semiconductor thyratron 34 returns to a non-conductive condition and the signal generator circuit of FIG. 3 is ready to begin the next cycle of operation upon the occurrence of the next trigger pulse from pulse generator 20.

Figure 10:
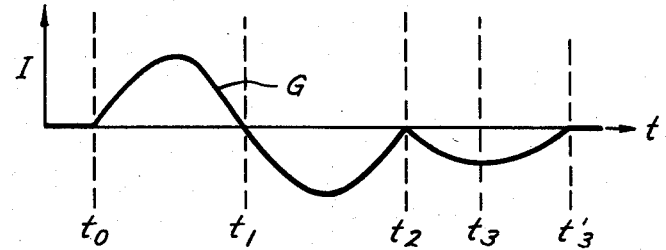

The current flow through inductor 13 during a typical cycle of operation is represented by waveform G of FIG. 10. The portion of this current represented in the interval $t_2-t_3'$ represents the recharging current which is supplied to the capacitor 14 while the semiconductor thyratron 34 is conductive. Since this recharging current is supplied by way of the inductor 13, which is the inductor element in the series circuit 12, the duration of this pulse of recharging current is approximately equal to a half cycle of oscillation in the series circuit 12. This represents a slight increase in recharging time compared to the case of the FIG. 2 embodiment. This, however, is not objectionable in many applications. If a shorter recharging rate is desired in the case of the FIG. 3 circuit, a second and separate inductor may be used to supply the recharging current to the capacitor 14, the inductance of this inductor being chosen to provide a shorter recharging time.

A particular advantage of the FIG. 3 circuit is the provision of the circuits which provide in an automatic manner the desired initial delay in starting the operating of the circuit until the capacitor 14 has charged up to the desired value. If desired, this automatic delay feature may also be incorporated in the embodiment of FIG. 2. Also, in any of the other embodiments, the load element may be coupled in series with the series circuit 12 by means of a transformer in the manner indicated in FIG. 3. In fact, this manner of coupling is preferred either where the load is of the high impedance type or where the load voltage and not the load current is the matter of primary concern. In some cases, the load coupling transformer may be combined with the inductor 13, the inductor 13 constituting the primary winding of the transformer.

As mentioned, signal generators in accordance with the present invention are particularly useful in the case of geophysical explorations made in a borehole drilled into the earth. In this regard, the simplicity of construction yet efficient operation of the signal generator is particularly advantageous in the narrow confines of such a borehole. One form of borehole exploration system wherein the improved signal generator of the present invention may be used with advantage is described in Patent No. 2,948,846, granted to M. A. Coufleau on August 9, 1960. This particular exploration system uses a system of electromagnetic exploring coils. The present invention is, of course, also useful with other types of borehole exploration systems such as those which use electrodes for emitting currents directly into the earth formations and those using sonic transmitters and receivers for emitting sound waves or acoustic energy into the earth formations.

The usefulness of the present invention is not limited to the field of geophysical exploration and the invention may in fact be used with advantage in various types of telemetering systems generally. In particular, the present invention is particularly useful as the source of exciting current or voltage for the transducer devices or primary sensing devices in a telemetering system. Also, the present invention is useful in any other type of application wherein signals of the particular type generated by the present invention are needed or would provide particular advantages.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A signal generator comprising: a series cricuit including an inductor, a capacitor, load means and a first controllable switching device; circuit means for charging the capacitor; circuit means for rendering the first switching device conductive to enable the capacitor to discharge through the inductor and the load means; a second controllable switching device included in the charging circuit means; and circuit means responsive to a voltage condition in the series circuit for rendering the second switching device conductive to enable rapid recharging of the capacitor.

2. A signal generator comprising: a series circuit including an inductor, a capacitor, and a first controllable switching device; circuit means for charging the capacitor; circuit means for rendering the first switching device conductive to enable the capacitor to discharge through the inductor; load circuit means coupled to the series circuit; a second controllable switching device included in the charging circuit means; and circuit means responsive to a voltage condition in the series circuit for rendering the second switching device conductive to enable rapid recharging of the capacitor.

3. A signal generator comprising: a series circuit including an inductor, a capacitor, load means and a first controllable switching device; high impedance circuit means for charging the capacitor; circuit means for periodically rendering the first switching device conductive to enable the capacitor to discharge through the inductor and the load means; a second controllable switching device included in the charging circuit means for decreasing the charging circuit impedance; and circuit means responsive to a voltage condition in the series circuit for periodically rendering the second switching device conductive to enable rapid recharging of the capacitor, the recharging periods occurring intermediate the discharging periods.

4. A signal generator comprising: a series circuit including an inductor, a capacitor, load means and a first controllable asymmetrically-conductive switching device; an asymmetrically-conductive element shunted across the first switching device in an opposite polarity manner; circuit means for charging the capacitor; circuit means for rendering the first switching device conductive to enable the series circuit to undergo one cycle of oscillation; a second controllable switching device included in the charging circuit means; and circuit means responsive to a voltage condition in the series circuit for rendering the second switching device conductive to enable rapid recharging of the capacitor.

5. A signal generator comprising: a series circuit including an inductor, a capacitor, and a first controllable asymmetrically-conductive switching device; an asymmetrically-conductive diode element shunted across the first switching device in an opposite polarity manner; high impedance circuit means for charging the capacitor; circuit means for periodically rendering the first switching device conductive to enable the series circuit to undergo one cycle of oscillation; load circuit means coupled to the series circuit; a second controllable switching device included in the charging circuit means; and circuit means responsive to a voltage condition in the series circuit at the termination of each cycle of oscillation for rendering the second switching device conductive to enable rapid recharging of the capacitor.

6. A signal generator comprising: a series circuit including an inductor, a capacitor, load means and a first controllable switching device; circuit means for charging the capacitor; circuit means for rendering the first switching device conductive to enable the capacitor to discharge through the inductor and the load means; a second controllable switching device included in the charging circuit means; and circuit means responsive to the voltage drop across the first switching device for rendering the second switching device conductive to enable rapid recharging of the capacitor.

7. A signal generator comprising: a series circuit including an inductor, a capacitor, load means and a first controllable switching device; energy supply means; high impedance circuit means for enabling the energy supply means to charge the capacitor; circuit means for rendering the first switching device conductive to enable the capacitor to discharge through the inductor and the load means; a second controllable switching device coupled between the energy supply means and the capacitor for establishing a relatively low impedance path therebetween; and circuit means operative subsequent to the initiation of the capacitor discharge for rendering the second switching device conductive to enable rapid recharging of the capacitor.

8. A signal generator comprising: a series circuit including an inductor, a capacitor, and a first controllable asymmetrically-conductive switching device; an asymmetrically-conductive element shunted across the switching device in an opposite polarity manner; energy supply means; high impedance circuit means for enabling the energy supply means to charge the capacitor; circuit means for rendering the first switching device conductive to enable the series circuit to undergo one cycle of oscillation; load circuit means coupled to the series circuit; a second controllable switching device coupled between the energy supply means and the capacitor for establishing a relatively low impedance path therebetween; and circuit means responsive to termination of the cycle of oscillation for rendering the second switching device conductive to enable rapid recharging of the capacitor.

9. A signal generator comprising: a series circuit including an inductor, a capacitor, load means and an asymmetrically-conductive switching device; an asymmetrically-conductive element shunted across the switching device in an opposite polarity manner; circuit means for charging the capacitor; circuit means for supplying trigger pulses to the switching device for periodically rendering the switching device conductive to enable the series circuit to undergo one cycle of oscillation; circuit means included in the charging circuit means and operative subsequent to each cycle of oscillation for decreasing the charging circuit impedance to enable rapid recharging of the capacitor; and circuit means responsive to the voltage across the capacitor for preventing the application of any trigger pulses to the switching device until after this voltage has reached a predetermined value.

References Cited by the Examiner

UNITED STATES PATENTS

| | | | |
|---|---|---|---|
| 2,448,070 | 8/48 | Sunstein | 328—181 XR |
| 2,455,373 | 12/48 | Lester | 328—181 XR |
| 2,627,031 | 1/53 | Moore | 328—181 XR |
| 2,891,155 | 6/59 | Carr et al. | 328—67 |
| 2,907,900 | 10/59 | Hoyer et al. | 328—67 XR |
| 2,916,640 | 12/59 | Pearson | 328—67 XR |

JOHN W. HUCKERT, *Primary Examiner.*

ARTHUR GAUSS, *Examiner.*